United States Patent [19]

Hayes et al.

[11] Patent Number: 5,694,029

[45] Date of Patent: Dec. 2, 1997

[54] DIGITAL MEASUREMENT OF SWITCHING REGULATOR CURRENT

[75] Inventors: Stuart Hayes; Joshua Titus, both of Austin, Tex.

[73] Assignee: Dell USA, L.P., Round Rock, Tex.

[21] Appl. No.: 581,831

[22] Filed: Jan. 2, 1996

[51] Int. Cl.$^6$ ..................................................... G05F 1/56
[52] U.S. Cl. .......................................... 323/282; 323/285
[58] Field of Search .................................... 323/282, 283, 323/284, 285, 286, 287, 234, 235; 363/21, 89, 97, 41

[56] References Cited

U.S. PATENT DOCUMENTS

| | | | |
|---|---|---|---|
| 4,857,822 | 8/1989 | Tabisz et al. | 323/282 |
| 4,866,367 | 9/1989 | Ridley et al. | 323/287 |
| 5,055,993 | 10/1991 | Miyata et al. | 363/98 |
| 5,418,704 | 5/1995 | Hua et al. | 363/21 |
| 5,559,688 | 9/1996 | Pringle | 363/98 |
| 5,568,041 | 10/1996 | Hesterman | 323/207 |

OTHER PUBLICATIONS

Application Note AN6915.1 entitled "Application of the CA1524 Series Pulse–Width Modulator Ics", Apr. 1994 by Harris Semiconductor.

*Primary Examiner*—Adolf Berhane
*Attorney, Agent, or Firm*—Henry N. Garrana; Mark P. Kahler; Diana L. Roberts

[57] ABSTRACT

A switching power supply system for digitally measuring switching regulator current is provided. The switching power supply contains a pulse-width-modulator (PWM) controller for providing a series of constant voltage and constant frequency pulses to a tank circuit. The tank circuit provides a DC current to an electronic system. The duty cycle of the pulses, however, is varied, depending on the current drain of the electronic system. A counter is attached to an output of the PWM controller to provide a count that is relative to the width of an output pulse from the PWM controller. The count is provided to a power control system that utilizes the value of the count to determine the current output of the PWM controller. The power control system is also connected to the output of the tank circuit to monitor the voltage output of the PWM controller. The power control system utilizes the determined current output, and the monitored voltage output to determine the instantaneous power output of the PWM controller.

31 Claims, 3 Drawing Sheets

DIGITAL MEASUREMENT OF SWITCHING REGULATOR CURRENT

BACKGROUND

1. Field of the Invention

This invention relates in general to the field of switching power supplies, and more particularly to devices for monitoring the output power of switching power supplies.

2. Description of the Related Art

A number of today's electronic devices utilize regulated power supplies to provide DC voltages to their circuits. An ideal regulated power supply is an electronic circuit designed to provide a predetermined DC voltage output $V_O$ which is independent of the current $I_L$ drawn from $V_O$, and also of any variations in the ac line voltage. Typical regulated power supplies provide a voltage sense input which is connected to $V_O$ which monitors $V_O$ and increases the current $I_L$ as the value of $V_O$ begins to drop.

Two types of regulated power supplies have been used to power electronic devices: linear and switching. The former is old technology, dating from the days when the first radios were freed from their need for storage batteries in the 1920s. The latter rates as high technology, requiring the speed and efficiency of solid-state electronic circuitry. See *The Winn L. Rosch Hardware Bible*, $3^{rd}$ ed, pages 381–382. Although more complex than linear power supplies, switching supplies are more efficient. While designs vary, the typical switching power supply first converts the incoming 50–60 Hertz utility power to a much higher frequency of pulses (in the range of 20,000 Hz, above the range of normal human hearing) by switching it on and off using an electrical component called a triac. The high frequency pulses are then rectified to provide a DC output voltage of typically 12 volts DC. This DC voltage is then provided to a DC step down converter for providing the desired current and power to a system. The step down converter utilizes a digital technique called pulse-width modulation. That is, the duration of each power pulse is varied in response to the needs of the electronic circuitry being supplied. The width of the pulses is controlled by the electronic switch; shorter pulses result in a lower output current. For a general background on pulse width modulators, see App Note AN6915.4 by Harris Semiconductor, incorporated herein by reference.

While regulated switching power supplies are efficient at providing constant voltage outputs of varying current, they have heretofore had no cost effective mechanism which allows the system in which they are used to determine the power output by them. For purposes of power conservation, and power supply safety, it is becoming increasingly important to not only monitor voltage output of a power supply, but also total power output.

To monitor power out of any system, it is typical to measure the voltage at a particular node, and the current through the node. And by using the equation P=VI, power can be determined. However, to monitor the current through a node, analog current sensors are required. While these may be placed in a system, and their outputs converted into a digital signal (using an ADC), they are expensive, and often have complex effects on the signals they measure.

For the foregoing reasons, there is a need for a system and method which allows current output of a switching power supply to be monitored, without requiting an analog current sensing device, and which allows a cost effective mechanism for calculating the total power output by the power supply.

SUMMARY

To address the above-detailed deficiencies, it is an object of the present invention to provide a power control system for monitoring the power output of a switching power supply.

Accordingly, in the attainment of the aforementioned object, it is a feature of the present invention to provide a power supply system which includes a controller for providing a series of pulses as output, a tank circuit, connected to the controller, for converting the pulses into a power output, a control system, connected to the power output, for measuring the voltage of the power output, and a counter, connected to the series of pulses, for counting the width of pulses within the series. By counting the width of the pulses within the series, the current provided by the controller may be determined. And, by utilizing the measured voltage, and the determined current, the power output may be calculated.

An advantage of the present invention is that the power output of the switching power supply may be determined without requiring typical current monitoring devices such as a current sensor.

An additional feature of the present invention is to provide a power supply system where the controller is a pulse width modulator having a fixed frequency output. The pulse output is a series of pulses having a constant voltage but with varying duty cycle. The duty cycle varies to vary the current output of the controller. As the duty cycle increases, the current output of the controller increases.

An additional feature of the present invention is to provide a controller which includes a voltage sense input which is connected to the power output. The voltage sense input may be used to vary the duty cycle of the pulses for the purpose of maintaining a constant level voltage at the power output.

Another feature of the present invention is that the width of the pulses corresponds to the current provided by the controller. By determining the width of the pulses (by using the counter), the current provided by the controller may be calculated.

A further feature of the present invention is to provide a counter that determines the width of a pulse by beginning to count on the rising edge of a pulse, and stops counting on the next falling edge of the pulse. If the power supply is delivering negative voltage, the count may begin on the falling edge of a pulse, and stop on the next rising edge of the pulse.

In an additional embodiment of the present invention, a switching power supply system is provided which delivers DC power to an electronic device. The switching power supply system includes a controller, for providing as output a series of pulses having a fixed frequency, a tank circuit, connected to the output of the controller, for converting the series of pulses into a DC output for use by the electronic device, a counter, connected to the series of pulses, for counting the width of pulses within the series, and a power control system, connected to the counter, and connected to the DC output, for calculating the power provided to the electronic device.

An additional feature of the present invention is to provide a series of pulses where the pulses are of a fixed frequency, but vary in duty cycle. The variance of the duty cycle corresponds to the current provided by the controller. By counting the width of pulses within the series, the current provided by the controller may be determined. And, by multiplying the voltage output by the calculated current, the power output may be calculated.

A further feature of the present invention is to provide a counter which includes a reset, connected to the series of pulses, for resetting the counter at the beginning of each pulse cycle, and a latch, connected to the power control system, for storing the value of the count associated with the width of the pulses, and for providing the value to the power control system.

An additional feature of the present invention is to provide a power control system which utilizes the value provided by the counter, and the measured voltage of the DC output to calculate the power provided to the electronic device.

A further feature of the present invention is to provide a power control system which includes a control output. The output of the power control system indicates the amount of power provided by the controller. In addition, the output may be used as a signal to control the power supply, such as for shutting down the power supply should the controller try to provide more power than is desired. For example, a predetermined threshold may be established which corresponds to a desired maximum power output. As this maximum is approached, as determined from the output signal, the power supply may be shut down.

A further feature of the present invention is to provide a method for calculating the power output provided by a switching power supply, where the switching power supply has a pulse width modulated controller whose output is a series of fixed frequency pulses of varying duty cycle. The method includes measuring the voltage output of the switching power supply, providing a counter for determining the width of the pulses, counting the width of the pulses, calculating a current value for the pulses corresponding to the counted width, and calculating the power output provided by the switching power supply by utilizing the measured voltage and the calculated current. In one embodiment of the present invention, the power output provided by the switching power supply is calculated by multiplying the measured voltage and the calculated current.

A further feature of the present invention is to provide a counter which counts in integer units such that the smallest width pulse has a count which is no larger than one.

The foregoing has outlined rather broadly the objects, features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

DESCRIPTION OF THE DRAWINGS

These and other objects, features, and advantages of the present invention will become better understood with regard to the following description, appended claims, and accompanying drawings where:

DETAILED DESCRIPTION

Figure 1:
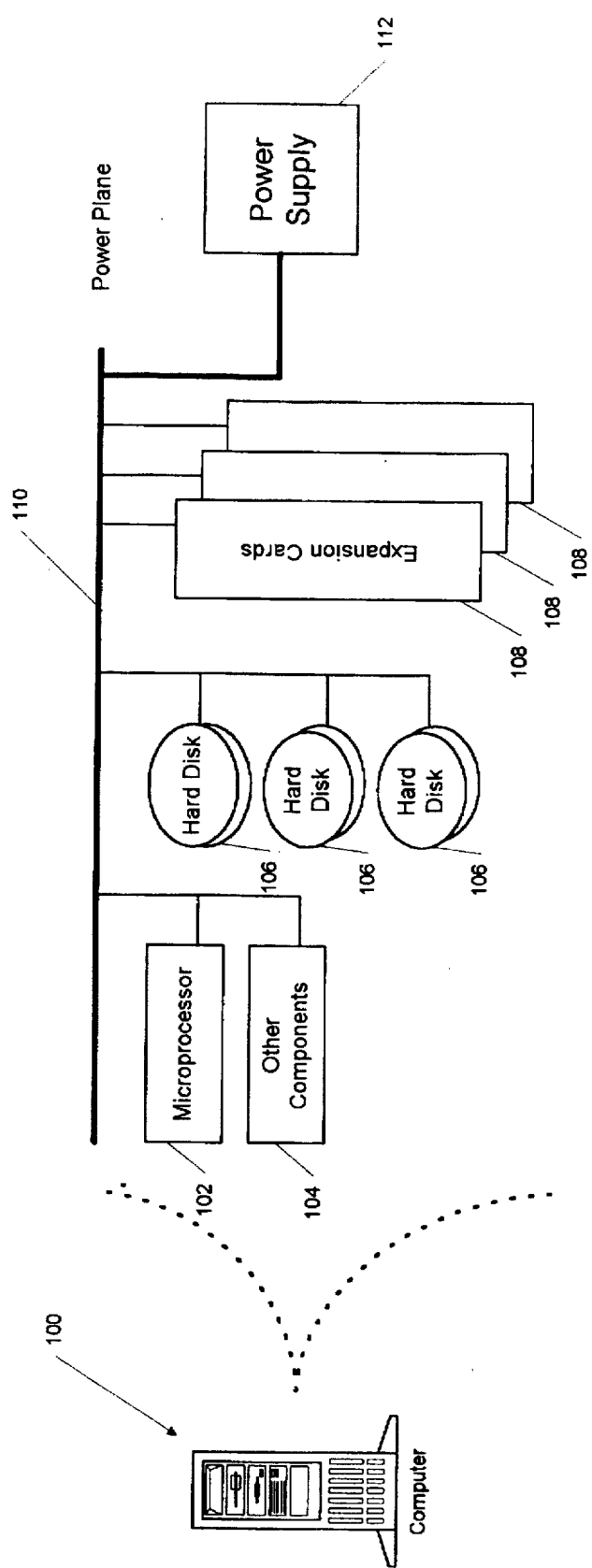
FIG. 1 is a view illustrating a computer having internal components powered by a power supply device incorporating the present invention.

Referring to FIG. 1, a computer 100 is shown. The computer 100 is a typical IBM compatible personal computer which may embody the present invention. However, it should be understood by one skilled in the art that the computer shown is for illustrative purposes only, and that the present invention may be located in a variety of electronic devices.

The computer 100 contains a microprocessor 102, other components 104 (such as a chip set, video controller, memory, etc.), a plurality of hard disks 106, and a plurality of expansion cards 108. The components 102–108 are connected to a power plane 110 which is driven by a power supply 112. The power supply 112 provides power, as needed, to all components within the computer 100.

Figure 2:
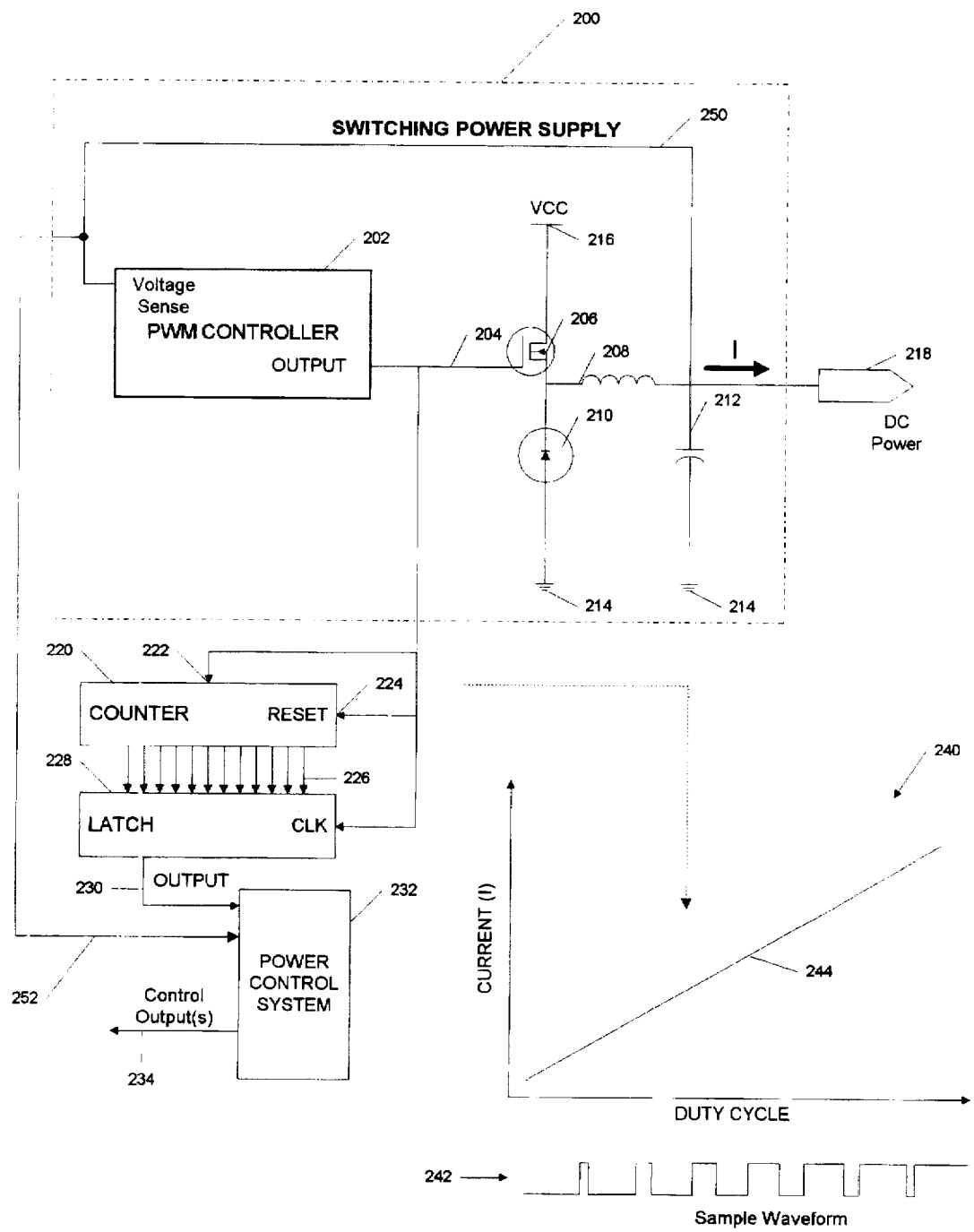
FIG. 2 is a schematic diagram illustrating circuitry of one embodiment of the present invention for a power supply.

Now referring to FIG. 2, a power supply 200 is shown. The power supply 200 is illustrative of a type of power supply that may be used to power electronic devices, such as shown in FIG. 1. The power supply 200 contains a pwm (pulse width modulated) controller 202. The pwm controller 202 provides a series of pulses (not shown) of fixed frequency and voltage level, but which may vary in duty cycle. It should be understood that the pwm controller 202 being described is only one embodiment of the present invention. Other types of pwm controllers may be used without departing from the scope of the present invention.

The pwm controller 202 provides a series of pulses on output line 204. The output line 204 is connected to the gate of FET 206 for turning the FET 206 on/off. The drain of FET 206 is connected to VCC 216 for power. The source of FET 206 is connected to diode 210 and to inductor 208. The other end of the diode 210 is connected to ground 214. The distal end of the inductor 208 is connected to a capacitor 212. The distal end of the capacitor 212 is connected to ground 214. It should be appreciated by one skilled in the art that the FET 206, inductor 208 and capacitor 212 arrangement is an LC tank circuit which is typically used for converting a series of pulses into a DC output. The power supply operates by chopping an unregulated DC voltage. The frequency of the circuit waveforms remains constant but the duty cycle is varied to effect regulation. The output LC filter 208, 212, together with the free-wheeling diode 210, smooths the chopped waveform. When FET 206 is turned on diode 210 is nonconductive and current flows from $V_{CC}$ 216 through inductor 208 to the DC output at node 218. When FET 206 is off, the reserve energy in capacitor 212 provides the necessary current to the load.

The pwm controller 202 also contains a voltage sense input connected to line 250 for monitoring the voltage present at the tank circuit output. By monitoring the voltage on line 250, the pwm controller can vary the duty cycle of the series of pulses, and hence the current to the load, to maintain a constant voltage.

The output 204 of the pwm controller is also connected to a counter 220 at its input 222 and to its reset pin 224. The operation of the counter 220 will be described below. The output lines 226 of the counter 220 are connected to a latch 228. The latch 228 has an output 230 which is connected to a power control system 232. The power control system has an additional input which is connected to signal line 252 for detecting the voltage level at the output of the tank circuit. The power control system 232 has at least one control output 234.

The operation of the counter 220, latch 228 and power control system 232 is as follows. On the rising edge of a first pulse output from the pwm controller 202, the counter 220 is reset at input 224. The counter 220 begins counting in integer units until the first pulse voltage level falls below a predetermined threshold. At that point, the counter 220 stops counting, and provides the counted value on output lines 226. Prior to the counter being reset, the counted value is stored into the latch 228 which in turn provides the counted value to the power control system 232. It should be appreciated that the value of the count provided by the counter 224 is relative to the duty cycle of the pulse output by the pwm controller 202. The greater the duty cycle of a pulse, the higher the count. The reverse is also true.

It is not important that an absolute count reference be established for the counter 220, although the counter should be able to provide a count for even the smallest possible pulse out of the pwm controller 202. What is important is that the count correspond to the width of a pulse output. Since the width of a pulse output corresponds to the current which is provided by the pulse, a count value associated with the width of a pulse may be used to calculate the current provided by a pulse. The power control system 232 therefore reads the output 230 of the latch 228, and calculates the current provided by a pulse. This is shown in graph 240 where a sample pulse waveform (of fixed voltage and frequency) is illustrative of the output of pwm controller 202. The line 244 illustrates the increase in current provided by the sample waveform 242. This line 244 may be calculated by the power control system 232 based on pulse widths counted by the counter 220. As the width of the pulses increases, the calculated current provided by the pulses also increases.

The power control system 232 may be used not only to calculate the current provided by the pwm controller 202, but may also be used to monitor, at input 252, the voltage output at node 218. And, by determining the voltage output at node 218, and the current provided by the pwm controller 202, the power output of the power supply 200 may be determined by the equation P=VI. Furthermore, by determining the instantaneous power output of the power supply 200, the controller may provide control outputs on line 234 which may be used by either the power supply 200, or the electronic device (not shown) for other matters.

For example, continuous power output may be monitored by power management software which is interested in power conservation, either for a single electronic device, or for multiple devices on a network. By monitoring the control output 234, a log of power usage for the power supply 200 may be developed. In addition, systems responsible for protecting the power supply 200, or an electronic device powered by the power supply 200 may monitor the control output 234 to ensure that maximum power output thresholds are not exceeded. If the control output 234 indicates a dangerous condition, the power supply 200 may be shut down.

Figure 3:
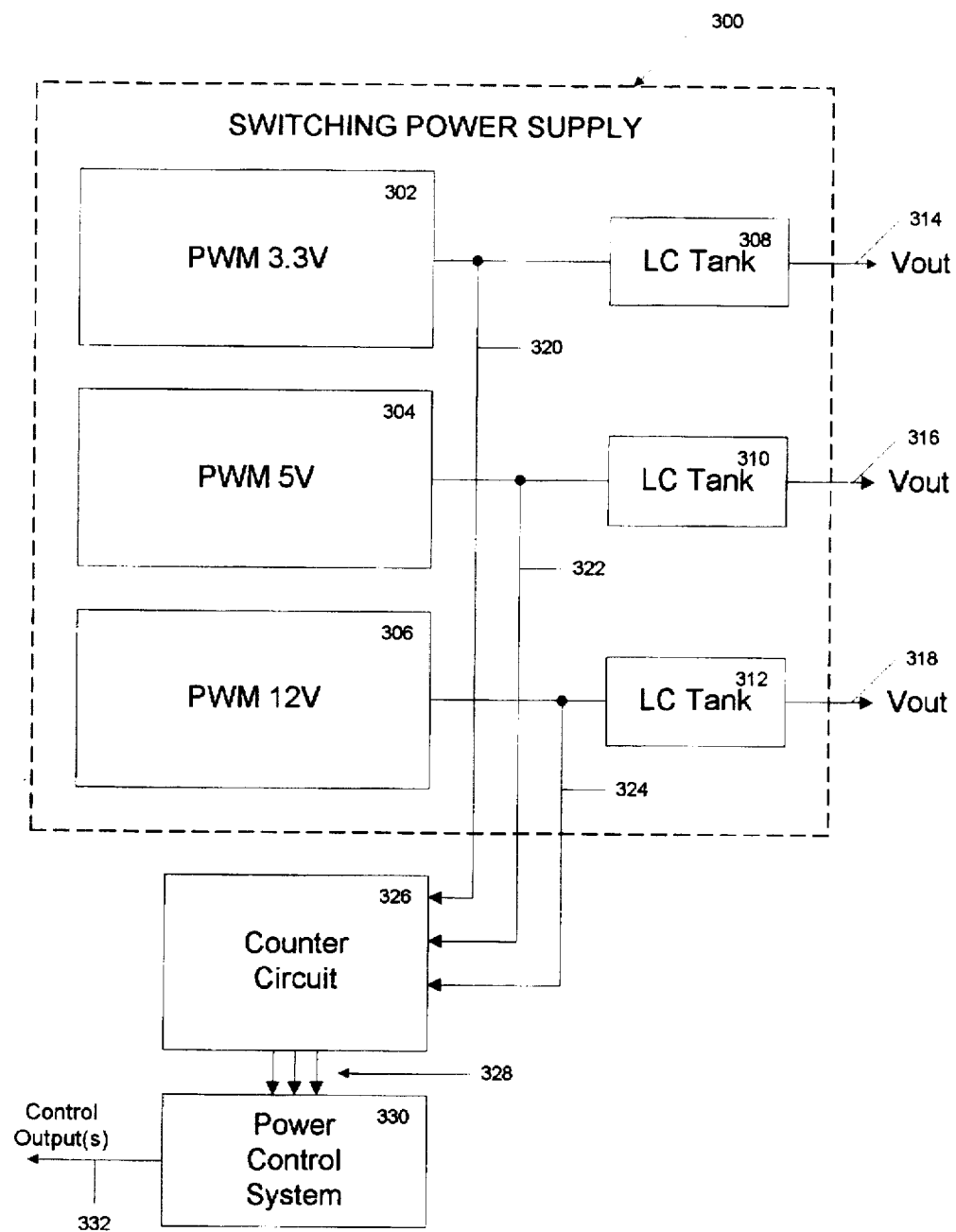
FIG. 3 is a schematic diagram illustrating circuitry of an additional embodiment of the present invention where a switching power supply provides more than one voltage output.

The switching power supply 200 is shown in FIG. 2 as having a single output. However, as should be appreciated by one skilled in the art, the power supply 200 may also have a plurality of outputs as shown in FIG. 3. In FIG. 3, a switching power supply 300 is shown. The power supply 300 contains a 3.3 volt pwm controller 302, a 5 volt pwm controller 304 and a 12 volt pwm controller 306. The controllers 302, 304 and 306 are connected to associated LC tank circuits 308, 310 and 312, respectively. The tank circuits 308, 310 and 312 provide DC output voltages at nodes 314, 316 and 318, respectively. The outputs of the pwm controllers 302, 304 and 306 are connected to a counter circuit 326 via signal lines 320, 322, and 324. The counter circuit 326 counts the pulse width of a series of pulses for each pwm controller, in the manner described with reference to FIG. 2. The counter circuit 326 provides counted values of pulses on output lines 328 to a power control system 330.

The control system may then provide control outputs on lines 332 in the manner described with reference to FIG. 2.

Although the present invention has been described in considerable detail with reference to certain preferred versions thereof, other versions are possible. For example, the counter 220 may be configured to count the width of pulses by starting the count on the falling edge of a pulse, and stopping the count on the rising edge of a pulse. In addition, it is not necessary that the counter provide an output for each pulse in a series. It is possible that one embodiment of the present invention monitor the pulse width of selected pulses within a series. Also, it should be appreciated that the counter 220, latch 228 and power control system 232 may be embodied in a single device. An important aspect of the present invention is that current output may be calculated by the present invention by monitoring the pulse width output of a pwm controller in a power supply. Thus, it should be understood that the present invention provides a system which allows the current output, and therefore the power output of a power supply to be determining by measuring the pulse width output of the supply's pwm controller.

Although the present invention and its advantages have been described in detail, it should be understood that various changes, substitutions and alterations can be made herein without departing from the spirit and scope of the invention as defined by the appended claims.

We claim:

1. A power supply system comprising:
   a controller for providing a series of pulses as output;
   a tank circuit, connected to said controller, for converting said pulses into a power output having a voltage and a current;
   a control system, connected to said power output, for measuring the voltage of said power output; and
   a counter, connected to said series of pulses, for counting the width of a pulse within said series, and for providing a count to said control system;
   whereby said count is used by said control system to determine the current output by said controller.

2. The power supply system as recited in claim 1, wherein said controller is a pulse width modulator.

3. The power supply system as recited in claim 2, wherein said pulse width modulator delivers a series of constant voltage pulses with varying duty cycles.

4. The power supply system as recited in claim 3, wherein said constant voltage pulses have a fixed frequency.

5. The power supply system as recited in claim 1, wherein said series of pulses vary in duty cycle to vary the power output of said controller.

6. The power supply system as recited in claim 1, wherein said tank circuit converts said series of pulses into a DC voltage output.

7. The power supply system as recited in claim 1, wherein said tank circuit comprises:
   a transistor, connected to said controller;
   an inductor connected to said transistor; and
   a capacitor, connected to said inductor;
   whereby said capacitor and said inductor act to convert said series of pulses into a DC voltage.

8. The power supply system as recited in claim 1, wherein said controller further comprises a voltage sense input which is connected to said power output.

9. The power supply system as recited in claim 8, wherein said voltage sense input is used by said controller to vary the duty cycle of said series of pulses.

10. The power supply system as recited in claim 1, wherein said control system measures the voltage of said power output to determine the power output of said tank circuit.

11. The power supply system as recited in claim 1, wherein said counter begins counting on the rising edge of said pulse within said series, and stops counting on the next falling edge of said pulse within said series.

12. The power supply system as recited in claim 11, wherein said counter by counting determines an on-time for said pulse within said series.

13. The power supply system as recited in claim 1, wherein said counter begins counting on the falling edge of said pulse within said series, and stops counting on the next rising edge of said pulse within said series.

14. The power supply system as recited in claim 13, wherein said counter by counting determines an on-time for said pulse within said series.

15. The power supply system as recited in claim 1, wherein said counter further comprises an output which corresponds to said count associated with the width of said pulse within said series.

16. The power supply system as recited in claim 15, wherein said output is connected to said control system.

17. The power supply system as recited in claim 16, wherein said control system reads said output from said counter, and said voltage of said power output, to determine the power provided by said controller.

18. A switching power supply system for providing DC power to an electronic device, the switching power supply system comprising:

a controller, for providing as output a series of pulses having a fixed frequency;

a tank circuit, connected to said output of said controller, for converting said series of pulses into a DC output for use by the electronic device;

a counter, connected to said series of pulses, for counting the width of pulses within said series; and a power control system, connected to said counter, and connected to said DC output, for calculating the power provided to the electronic device.

19. The power supply system as recited in claim 18, wherein said series of pulses provided by said controller have a constant voltage.

20. The power supply system as recited in claim 18, wherein said series of pulses having a fixed frequency may vary in duty cycle.

21. The power supply system as reeked in claim 20, wherein the variance of said duty cycle acts to vary the power output provided by said controller.

22. The power supply system as recited in claim 18, wherein said count of said width of pulses may be correlated to the current provided by said controller.

23. The power supply system as recited in claim 18, wherein said counter further comprises:

a reset, connected to said series of pulses, for resetting the counter at the beginning of each pulse cycle; and a latch, connected to said power control system, for storing the value of the count associated with said width of said pulses, and for providing said value to said power control system.

24. The power supply system as recited in claim 23, wherein said count associated with said width of said pulses correlates to the current provided by said controller.

25. The power supply system as recited in claim 23, wherein said power control system utilizes said value provided by said counter, and the voltage of said DC output, to calculate said power provided to the electronic device.

26. The power supply system as recited in claim 18, wherein said power control system further comprises a control output, the output indicative of the amount of power provided by said controller.

27. The power supply system as recited in claim 26, wherein said control output may be used to shut down the power supply should said controller try to provide more power than is desired.

28. A method for calculating the power output provided by a switching power supply, the switching power supply having a pulse width modulated controller whose output is a series of fixed frequency pulses of varying duty cycle, the method comprising:

measuring the voltage output of the switching power supply;

providing a counter for determining the width of the pulses;

counting the width of the pulses;

calculating a current value for the pulses corresponding to the counted width; and calculating the power output provided by the switching power supply by utilizing the measured voltage and the calculated current.

29. The method for calculating the power output provided by a switching power supply as recited in claim 28, wherein the measured voltage and the calculated current are multiplied together to calculate the power output.

30. The method for calculating the power output provided by a switching power supply as recited in claim 28, wherein the counter counts in integer units such that the smallest width pulse has a count no larger than one.

31. The method for calculating the power output provided by a switching power supply as recited in claim 28, further comprising:

if the calculated power exceeds a predetermined threshold, shutting off the switching power supply.

* * * * *